United States Patent [19]
Akiyama et al.

[11] Patent Number: 6,091,677
[45] Date of Patent: Jul. 18, 2000

[54] DISC PLAYING DEVICE

[75] Inventors: Hiroo Akiyama; Takehiro Mabuchi, both of Hamamatsu, Japan

[73] Assignee: Yamaha Corporation, Hamamatsu, Japan

[21] Appl. No.: 08/907,289

[22] Filed: Aug. 6, 1997

Related U.S. Application Data

[63] Continuation of application No. 08/522,045, Aug. 31, 1995, abandoned.

[30] Foreign Application Priority Data

Sep. 1, 1994 [JP] Japan .................................. 6-232378

[51] Int. Cl.[7] ........................... G11B 17/22; G11B 17/26
[52] U.S. Cl. ............................................... 369/37
[58] Field of Search ............................. 369/36, 37, 75.1, 369/77.1, 178, 192; 360/92

[56] References Cited

U.S. PATENT DOCUMENTS

| | | | |
|---|---|---|---|
| 5,115,419 | 5/1992 | Akiyama et al. | 369/37 |
| 5,270,989 | 12/1993 | Kimura | 369/37 |
| 5,431,352 | 7/1995 | Isobe | 369/37 |
| 5,513,157 | 4/1996 | Saito et al. | 369/37 |
| 5,528,567 | 6/1996 | Kim | 369/37 |

*Primary Examiner*—Stuart S. Levy
*Assistant Examiner*—George J. Letscher
*Attorney, Agent, or Firm*—Pillsbury Madison & Sutro LLP

[57] ABSTRACT

To eject a transfer tray while no disc is played, the transfer tray is moved to an ejected position with a rotary table rotated through an angle corresponding to $1/10$ revolution, so that even the rearmost disc holding portion on the rotary table sufficiently projects or is exposed out of a body of the device. This permits simultaneous disc replacement for the disc holding portions. To eject the transfer tray during playing of a disc, the transfer tray is moved to the ejected position without the rotary table being rotated, so that the rearmost disc holding portion on the rotary table does not sufficiently project out of the body of the device, permitting disc replacement only for the other disc holding portions than the rearmost disc holding portion.

5 Claims, 7 Drawing Sheets

DISC PLAYING DEVICE

This is a continuation of application Ser. No. 08/522,045, filed Aug. 31, 1995, now abandoned.

BACKGROUND OF THE INVENTION

The present invention relates to changer-type disc playing devices where plural discs are set on a rotary table for automatic successive playing or reproduction of the discs, and more particularly to a carrousel-changer-type disc playing device which allows all of plural discs set on a rotary table to be simultaneously replaced with others.

CD (Compact Disc) changers which have plural CD's loaded therein and automatically play the loaded CD's in succession have been becoming the mainstream of today's CD players. Among typical examples of such CD changers is the so-called carrousel type which is designed to successively play plural discs set on a rotary table mounted on a transfer tray.

Figure 2:
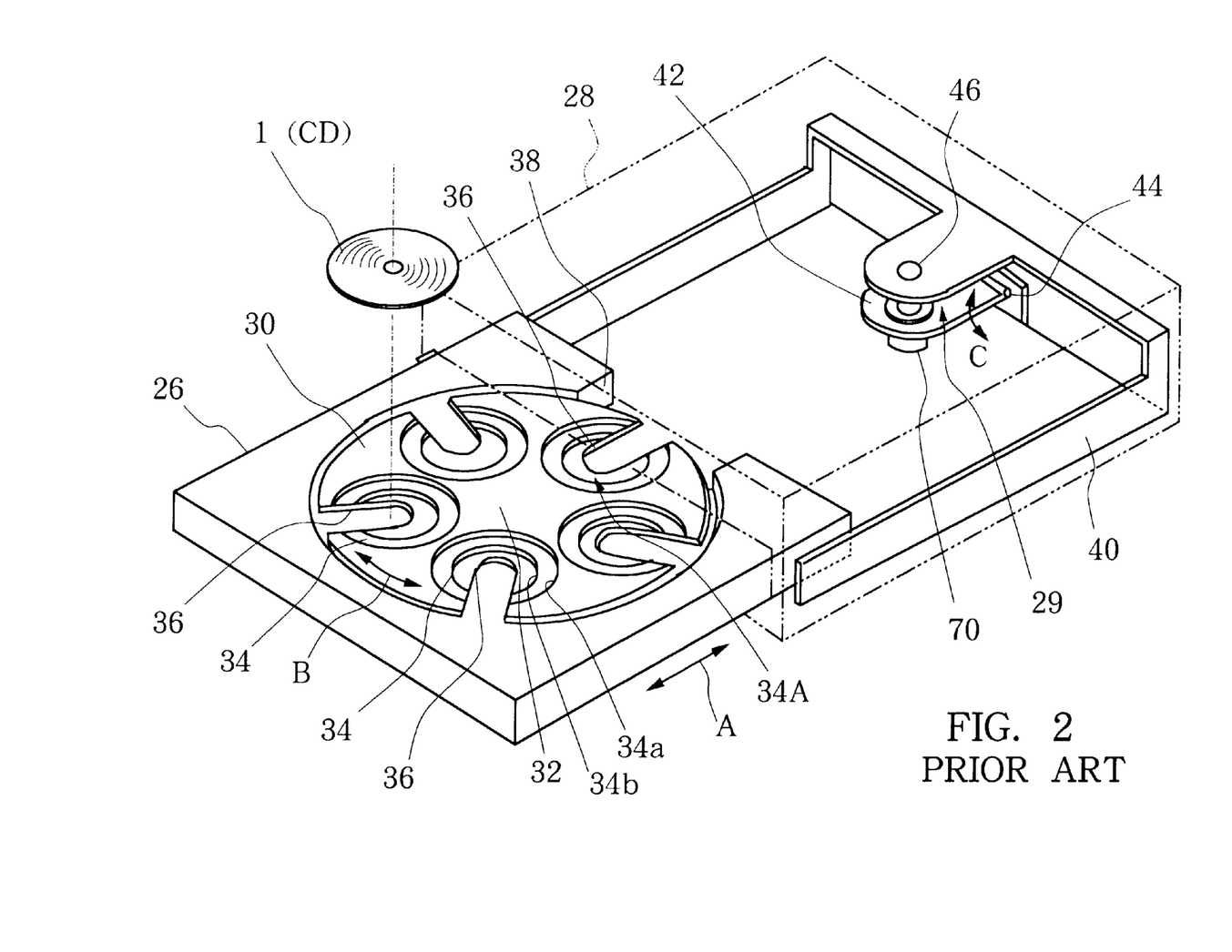
FIG. 2 is a perspective view of an example of the conventional carrousel-type CD changer.
Figure 3:
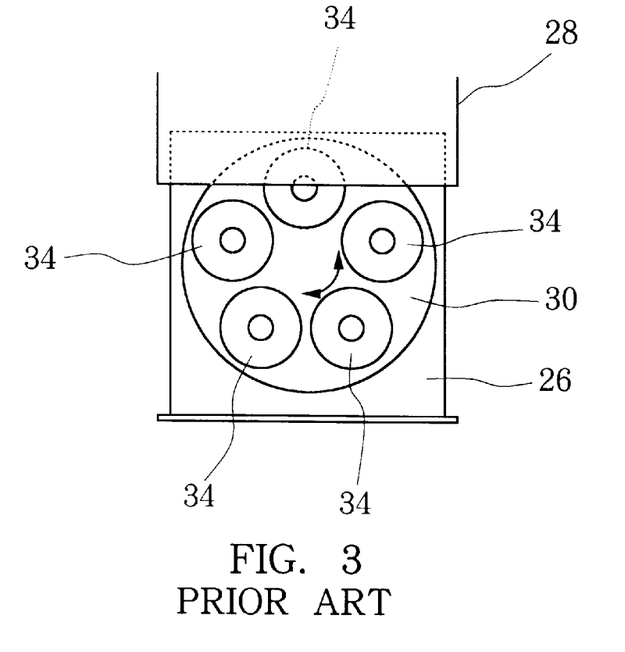
FIG. 3 is a plan view showing a manner in which disc replacement is conducted in the CD changer of FIG. 2.

FIG. 2 is a perspective view of the conventional carrousel-type CD changer which, during playing of one CD, can eject the tray to provide access thereto by the user for replacement of one or more discs. The transfer tray 26 is movable in directions denoted by arrow A between a retracted position where the tray 26 is fully received within a body 28 of the device and a predetermined ejected position where the tray 26 projects out of the body 28. A rotary table 30 is mounted on the transfer tray 26 in such a manner that it can rotate in directions denoted by arrow B. In the rotary table 30, there are formed plural (five in the illustrated example) disc holding portions 34 which hold a corresponding number of discs (CD's) 1 equidistantly around the center or axis of rotation 32. Each of the disc holding portions 34 includes a larger or outer round recess 34a for holding therein a 12 cm CD and a smaller or inner round recess 34b for holding therein an 8 cm CD. Further, each of the disc holding portions 34 has a groove 36 that extends to open radially outwardly of the rotary table 30 in such a manner that a playing unit 28 contained in the body 28 is inserted therein for playing a disc. A rear end opening 38 is formed centrally in the rear end portion of the transfer tray 26 so that it communicates with the groove 36 of the disc holding portion 34A situated in a predetermined disc playing position in alignment with the playing unit 29. This allows the tray 26 to be moved to the ejected position even during playing of a disc by the playing unit 29.

A holder 42 holding a spindle motor 70 and an optical head constituting the playing unit 29 is supported centrally on the rear end portion of a mechanical base or chasis 40 within the body 28, in such a manner that the holder 42 can pivotally move, in vertically directions denoted by arrow C, below the transfer tray 26 about a pivot axis 44. Further, a disc clamper 46 is fixedly mounted on the chasis 40 above the transfer table 26 in opposed relation to a turntable of the playing unit 29.

As the holder 42 is pivoted upwardly when the transfer tray 26 is in the retracted position within the body 28, the spindle motor 70 and optical pickup are moved upwardly to be inserted into the groove 36 of one of the disc holding portions 34A that is in the disc playing position in alignment with the playing unit 29 (for convenience of description, this will also be referred to as an "aligned disc holding portion 34A"). Thus, the disc 1 is pulled from the aligned disc holding portion 34A to be placed on the turntable on the top of the spindle motor 70, and then the disc 1 is clamped by the disc clamper 46. In this clamped state, the disc 1 can be played by the optical head. Once a disc ejecting instruction is given during the playing of the disc 1, the playing unit 29 is pulled horizontally out of the groove 36 of the aligned disc holding portion 34A and opening 38 of the transfer tray 26, so that the transfer tray 26 can be moved out of the body 28 into the ejected position for replacement of one or more desired discs even while the playing unit 29 keeps playing the disc 1 loaded via the aligned holding portion 34A.

However, in the playing device as shown in FIG. 2 where the disc holding portion 34A holding a disc to be played is positioned centrally along the width of the rear end portion of the transfer tray 26 for playing the disc, the tray 26 moved to the ejected position does not fully project (or is exposed) out of the body 28 with the most part of the aligned disc holding portion 34A left within the body 28. Consequently, it is not possible to conduct disc replacement for the aligned disc holding portion 34A. Where disc replacement is to be conducted for any other disc holding portion 34 than that aligned disc holding portion 34A during playing of the disc loaded via the holding portion 34A, the desired disc replacement could be conducted very conveniently because this arrangement effectively prevents a new disc from being set in the aligned disc holding portion 34A during playing of the disc (should a new disc be set in the portion 34A, the disc being currently played by the playing unit 29 can not be returned to the holding portion 34A). But, in the prior disc playing device of the type as shown in FIG. 2, even where disc replacement is to be conducted while no disc is being played (i.e., where no disc is loaded in the playing unit 29 and hence disc replacement may be conducted for the aligned disc holding portion 34A as well), the most part of the holding portion 34A are left within the body 28, which makes it impossible to access the holding portion 34A for desired disc replacement.

Therefore, when disc replacement is to be conducted for the aligned holding portion 34A, it is necessary to first move the transfer tray 26 to the ejected position and then activate a "disc skipping key" to rotate the rotary table until the aligned holding portion 34A comes to a position where free access to the portion 34A is obtained. Thus, in the prior disc playing device, it was never possible to simultaneously conduct disc replacement for all the disc holding portions 34 of the rotary table 30.

SUMMARY OF THE INVENTION

It is therefore an object of the present invention to provide a carousel-changer-type disc playing device which, even where a disc holding portion in the disc playing position is positioned centrally along the width of the rear end portion of a transfer table, permits disc replacement to be simultaneously conducted for all disc holding portions by just moving the transfer tray to a predetermined ejected position.

In order to accomplish the above-mentioned object, the present invention provides a disc playing device which comprises a main body of the device, a transfer tray slidingly movable with respect to the main body between a retracted position where the transfer tray is received within the main body and an ejected position where the tray projects out of the body, a rotary table rotatably provided on the transfer tray and having a plurality of disc holding portions formed around the rotational axis of the table, a playing unit provided within the main body for playing a disc held on one of the holding portions which is positioned centrally along the width of the rear end portion of the tray in alignment with the playing unit, a rotary table drive section for rotating the rotary table, a rotary table position detection section for detecting a rotational position of the rotary table, and a rotary table position control section for, when a disc is to be played by the playing unit, positioning one of the holding portions holding that disc to be played centrally along the width of the rear end portion of the transfer tray, the control means positioning an intermediate portion between two adjacent disc holding portions centrally along the width of the rear end portion of the transfer tray when the transfer tray is to be moved to the ejected position while no disc is played by the playing unit.

According to the disc playing device thus arranged, when the transfer tray is to be moved to the ejected position while no disc is played by the playing unit, the intermediate portion between two adjacent disc holding portions is positioned centrally along the width of the rear end portion of the tray, so that the disc holding portion which has been in the disc playing position (i.e., the one having been in the rearmost position on the rotary table) is displaced slightly outwardly (toward the ejected position) away from the playing unit. Thus, when the transfer tray is in the ejected position, the most part or substantially entire part of the holding portion can project out of the body of the device, and therefore, desired disc replacement can be conducted simultaneously for all the disc holding portions.

Where the transfer tray can be moved to the ejected position even during playing of a specific disc, the rotary table position control section may be designed to perform further control such that the tray is moved to the ejected position with the disc holding portion having so far been holding the specific disc positioned centrally along the width of the rear end portion of the tray. Namely, when conducting disc replacement during playing of a specific disc, the transfer tray is just moved to the ejected position with the holding portion occupying the disc playing position kept centrally along the width of the rear end portion of the tray, without performing the control to position the intermediate portion between two adjacent disc holding portions centrally along the width of the rear end portion of the tray. It is therefore possible to prevent a new disc from being erroneously set in the holding portion occupying the disc playing position.

The disc playing device may further comprise a rotary table locking mechanism which, when the tray is moved to the ejected position, locks the rotary table against rotation from the above-mentioned rotational position. This prevents the rotary table from accidentally rotating when the tray is in the ejected position.

Further, light blocking and transmitting portions may be formed in a ring-shaped member that is provided in a predetermined position on the underside of the rotary table concentrically with the table, and the rotary table position detection section may comprise a pair of vertically movable light emitting and receiving elements which are provided on a chasis of the body of the device and face each other across the ring-shaped member. Thus, by positioning the rotary table position detection section in a predetermined raised position, the ring-shaped member provided on the underside of the rotary table is placed between the light emitting element and light receiving element, so that the light blocking and light transmitting portions can be identified so as to enable detection of a rotational position of the rotary table. On the other hand, by positioning the rotary table position detection section in a predetermined lowered position, the ring-shaped member on the underside of the rotary table is placed away from between the light emitting element and light receiving element, which thus allows the transfer tray to be moved out of the body of the device without causing collision of the rotary table against the rotary table position detection section. With this arrangement, the rotary table position detection section, which used to be provided on the transfer tray in the conventional disc playing devices, can be provided separately from the tray, and the installation of electric cables is highly facilitate.

For better understanding of the above and other features of the present invention, the preferred embodiments of the invention will be described in detail below with reference to the accompanying drawings.

DETAILED DESCRIPTION OF THE PREFERRED EMBODIMENTS

Figure 1A:
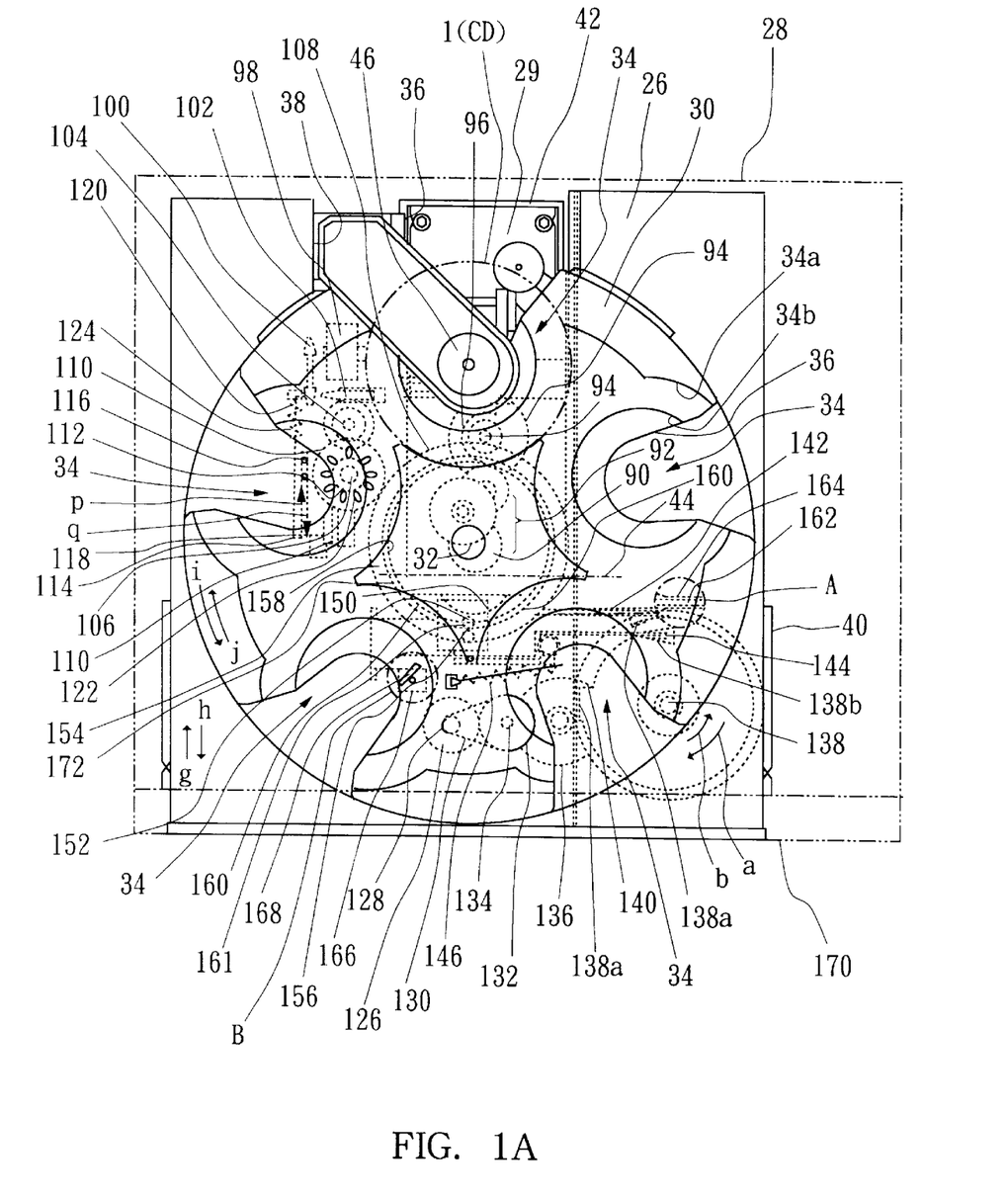
FIG. 1A is a plan view of a CD changer in accordance with an embodiment of the present invention, showing the internal structure of the changer when its tray is in the retracted position.
Figure 1B:
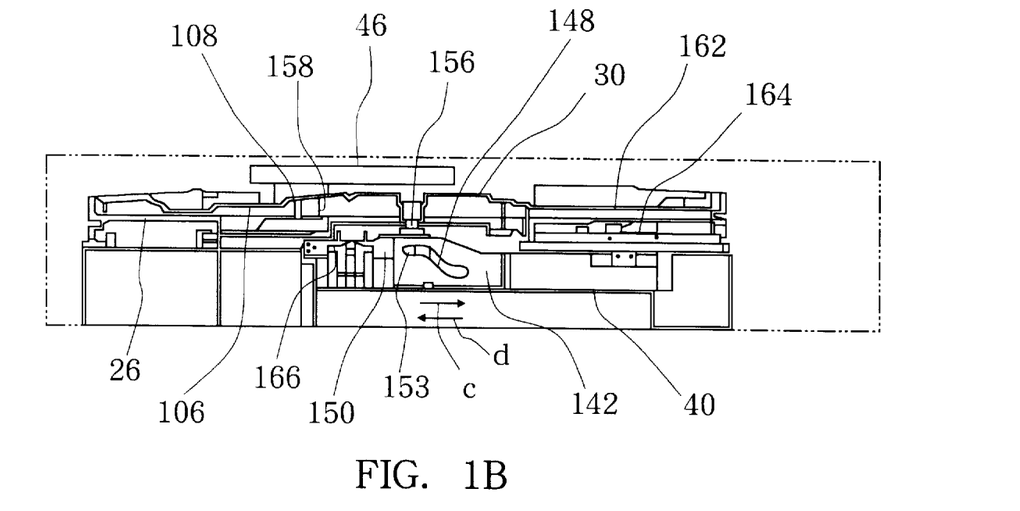
FIG. 1B is a front view of the CD changer of FIG. 1A, showing the internal structure of the changer when its tray is in a retracted position.
Figure 1C:
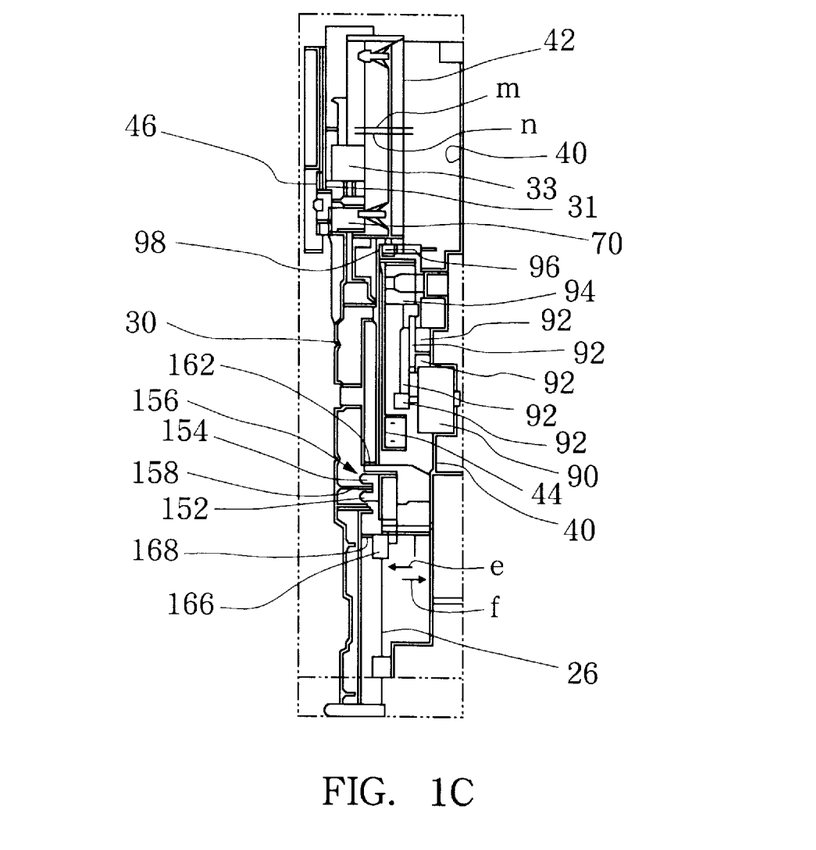
FIG. 1C is a side view of the CD changer of FIG. 1A, showing the internal structure of the changer when its tray is in the retracted position.

FIGS. 1A–1C illustrate a CD changer in accordance with an embodiment of the present invention showing the internal structure of the same when its transfer tray is in the retracted position, of which FIG. 1A is a plan view of the CD changer, and FIGS. 1B and 1C are front and side views through respective sectional positions of the CD changer. In FIGS. 1A–1C, similar elements to those of FIG. 2 are denoted by the same reference characters as in FIG. 2.

A transfer tray 26 is slidingly movable linearly with respect to a body of the device 28, in directions denoted by arrows "g" and "h", between a retracted position where the tray 26 is fully received within the body 28 and an ejected position where the tray 26 mostly projects out of the body 28. A rotary table 30 is mounted on the transfer tray 26 in such a manner that the rotary table 30 can rotate in directions denoted by arrows "i" and "j". In the rotary table 30 are formed plural (five in the illustrated example) of disc holding portions 34 which hold a corresponding number of discs (CD's) 1 equidistantly around the center or axis of rotation 32. One of the disc holding portions 34 positioned centrally along the width of the rear end portion of the transfer tray 26 is a disc holding portion 34A in the disc playing position which is aligned with a playing unit 29 (i.e., aligned disc holding portion), and the disc 1 loaded via this aligned disc holding portion 34A is played by the playing unit 29.

Each of the disc holding portions 34 includes a larger or outer round recess 34a for holding therein a 12 cm CD and a smaller or inner round recess 34b for holding therein an 8 cm CD. Further, each of the disc holding portions 34 has a groove 36 that extends to open radially outwardly of the rotary table 30 so that the playing unit 29 is inserted therein for playing a disc. A rear end opening 38 is formed centrally in the rear end of the transfer tray 26, and it communicates with the groove 36 of the disc holding portion 34A situated in the predetermined disc playing position in alignment with the playing unit 29 (i.e., aligned disc holding portion 34A). This allows the tray 26 to be moved away from the playing unit 29 to the ejected position even during playing of a disc by the unit 29.

A holder 42 holds the playing unit 29 which includes a spindle motor 70, a feed motor, a turntable 31, an optical head 33 etc. The holder 42 is supported centrally on the rear end portion of a mechanical base 40 within the body 28 in such a manner that the holder 42 can pivotally move in directions denoted by arrows "m" and "n" about a pivot axis 44. Further, a disc clamper 46 is secured to the mechanical base 40 in opposed relation to the turntable 31 of the playing unit 29. A clamping motor 90 is disposed on the mechanical base 40, and the rotational force of the motor 90 is transmitted to a cam body 94 via a transmission mechanism 92. In the outer peripheral surface of the cam body 94, there is formed a vertically slanting cam groove 96 in which a forward projection of the holder 42 is slidably received. Activating the clamping motor 92 causes the cam body 94 to rotate, so that the holder 42 pivots in the directions denoted by arrows "m" and "n" via the action of the cam groove 96.

As the holder 42 is pivoted upwardly by the clamping motor 90 when the transfer tray 26 is in the retracted position within the body 28, the playing unit 29 is moved upwardly to be inserted into the groove 36 of one of the disc holding portions 34 that is in the predetermined disc playing position aligned with the playing unit 29 (i.e., "aligned disc holding portion 34A"). Thus, the disc 1 held in the holding portion 34A is pulled to be placed on the turntable 31 and then clamped by the disc damper 46. In this clamped state, the disc 1 can be played by the optical head 33. Once a disc ejecting instruction is given during the playing of the disc, the playing unit 29 is pulled horizontally relative to the holding portion 34A out of the groove 36 thereof and opening 38 of the transfer tray 26, so that the transfer tray 26 can be moved out of the body 28 into the ejected position for replacement of any of the other discs 1 even while the playing unit 29 keeps playing the disc 1 loaded via the holding portion 34A.

On the mechanical base 40 are further disposed a table rotating motor 98, and a worm 102 that transmits the rotational force of the motor 98 via an endless belt 100. On the underside of the transfer tray 26, there are provided a worm wheel 104 meshing with the worm 102 and a gear 106 to which the rotation of the worm wheel 104 is transmitted. The gear 106 is in mesh with a gear 108 disposed in a predetermined position about the center of rotation 32, i.e., concentrically with the rotary table 30, in order to rotate the rotary table 30 in the directions denoted by arrows "i" and "j".

A rotating member 112 is provided concentrically with the gear 106, and the rotating member 112 have ten recesses 110 formed equidistantly from each other along the outer circumference thereof. Further, below the transfer tray 26, there is provided a lever 114 in such a manner that it can slide in directions denoted by arrows "p" and "q" by being guided by pins 116 and 118, during which time a projection 122 of the lever 114 moves into and out of one of the recesses 110 of the rotating member 112. The lever 114 is normally urged by a spring 120 in the arrow "q" direction.

The rotating member 112 and lever 114 together constitute a rotary table locking mechanism. Namely, when the transfer tray 26 is in the retracted position within the body 28, a locking in 124 abuts against the rear end of the lever 114 to cause the lever 114 to slide in the arrow "p" direction against the resilient biasing force of the spring 120, so that the projection 122 is moved out of the recess 110 so as to permit rotation of the gear 106 (this is an unlocked state where the rotary table 30 is free from locking by the locking mechanism). As the transfer tray 26 is driven in the arrow "h" direction to move out of the body 28, the lever 114 is disengaged from the locking pin 124 to be pulled by the spring 120 in the arrow "q" direction, and thus the projection 122 moves into one of the recesses 110 so as to prevent the rotation of the gear 106 (this is a locked state where the rotary table 30 is locked against rotation).

Figure 5:
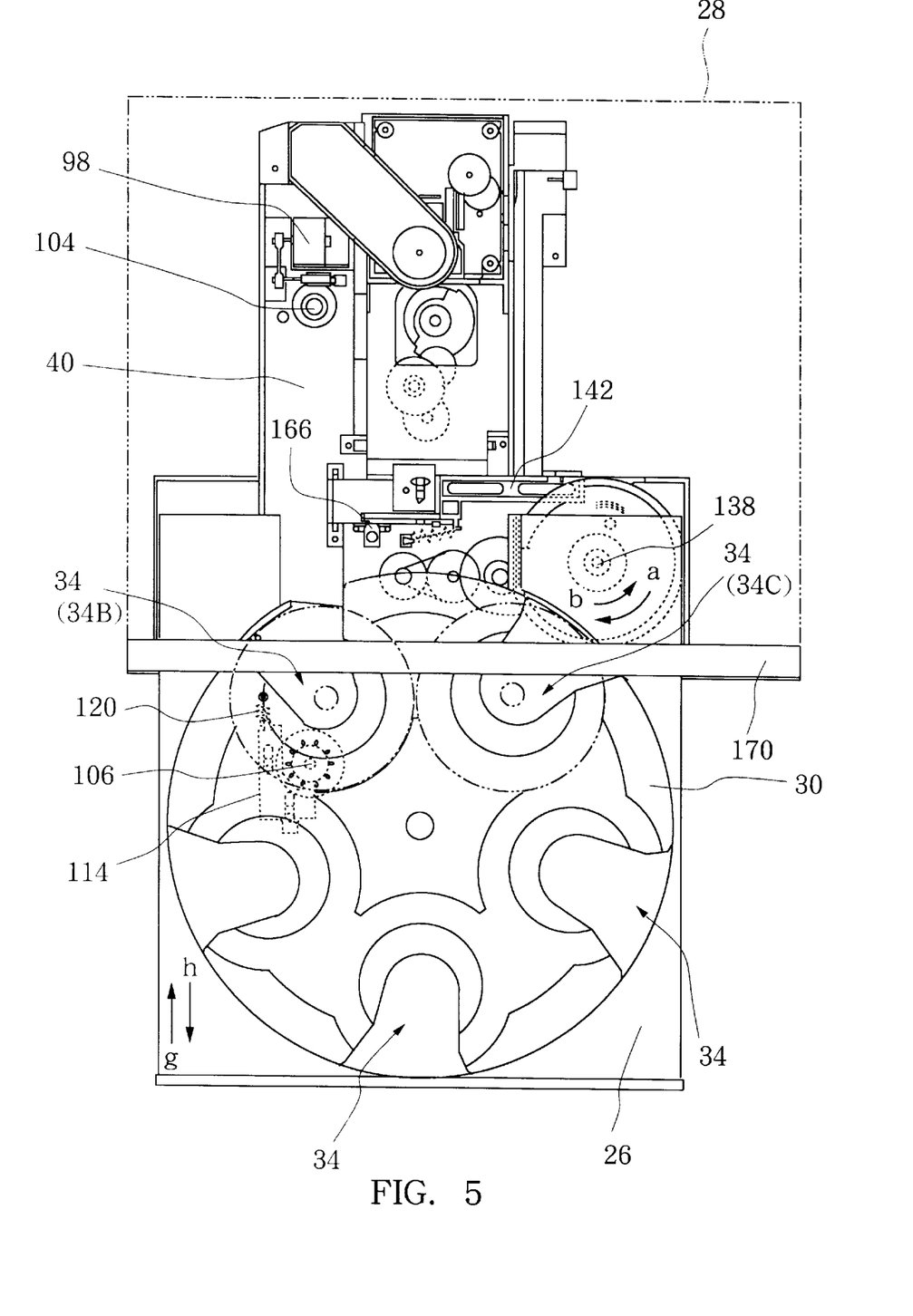
FIG. 5 is a plan view showing the CD changer of FIG. 1 when its transfer tray is ejected while no disc is played.

The gear ratio between the gears 106 and 108 in this embodiment is set at 1:4. Accordingly, four revolutions of the gear 106 cause a single revolution of the rotary table 30, during which time each of the recesses 110 of the rotating member 112 revolves a distance corresponding to 40 steps (10 recesses×4 revolutions). Thus, ⅕ revolution (corresponding to the interval between every two adjacent disc holding portions 34) of the rotary table 30 causes each of the recesses 110 to revolve eight steps (40 recesses×⅕ revolution), ⅒ revolution (corresponding to a half of the interval between every two adjacent disc holding portions 34) of the rotary table 30 causes each of the recesses 110 to revolve four steps (40 recesses×⅒ revolution), and so on. Because of this, in either a case where any one of the disc holding portions 34 is positioned centrally along the width of the rear end portion of the transfer tray 26 (as shown in FIG. 1) or a case where the intermediate portion between two adjacent disc holding portions 34 is positioned centrally along the width of the rear end portion of the transfer tray 26 (as shown in FIG. 5), one of the recesses 110 of the rotating member 112 and the projection 122 of the lever 114 are positioned to face each other. Thus, by causing the lever 114 to slide in the arrow "q" direction (i.e., causing the transfer tray 26 to move to the ejected position) in this condition, the rotary table 30 can be brought into the locked state.

Further, a loading motor 126 is supported on the mechanical base 40, and the rotational force of the motor 126 is transmitted via a pulley 128, an endless belt 130, a pulley 132, gears 134 and 136 and a loading gear 138. The loading gear 138 has an outer gear portion 138a formed over a predetermined range along the outermost periphery thereof, and an inner gear portion 138b formed over a predetermined range along a periphery slightly inner than the outermost periphery. The outer gear portion 138a meshes with a rack 140 provided on the underside of the transfer tray 26 along the direction of the linear movement of the tray 26, in order to linearly move the tray 26 between the retracted and ejected positions. The inner gear portion 138b meshes with a rack 144 formed in a slide cam 142 that is in turn provided on the mechanical base 40, in order to cause the slide cam 142 to slide in directions denoted by arrows "c" and "d".

The slide cam 142 is normally urged by a spring 146 in the arrow "d" direction and has a cam groove 148 formed therein which is in engagement with a pin 153 of a rotary table position detecting block 150. The rotary table position detecting block 150 is disposed on the mechanical base 40 for vertical movement toward and away from the base 40, and has a photo sensor 156 mounted on the top thereof which comprises a pair of opposed light emitting element (e.g., light emitting diode) 152 and light receiving element (e.g., photo transistor) 154. Below the rotary table 30, there is provided a ring-shaped member 158 in a predetermined position from the center of rotation 32 concentrically with the table 20. The ring-shaped member 158 has five slits (light transmitting portions) 160 for detecting a position of each of the disc holding portions, and the five slits are formed equidistantly from each other along the entire periphery of the member 158. In addition, only one reference position detecting slit (light transmitting portion) 161 is formed in the ring-shaped member 158 midway between two of the slits 160. The light emitting and receiving elements 152 and 154 of the photo sensor 156 are disposed to face each other across the ring-shaped member 158.

The slide cam 142 also has a protrusion 162, which, when the transfer tray 26 is in the retracted position, fits into a cavity 164 formed in the underside of the transfer tray 26 so as to prevent the linear movement of the tray 26 between the retracted and ejected positions against the urging force of the spring 120. A tray locking lever 166 is connected to the rotary table position detecting block 150. When the transfer tray 26 is in the retracted position, this tray locking lever 166 abuts against a plate portion 168 formed on the underside of the tray 26 and thereby prevents the linear movement of the tray 26 between the retracted and ejected positions against the urging force of the spring 120 in a similar manner to the protrusion 162 of the slide cam 142.

Figures 4A, 4B:
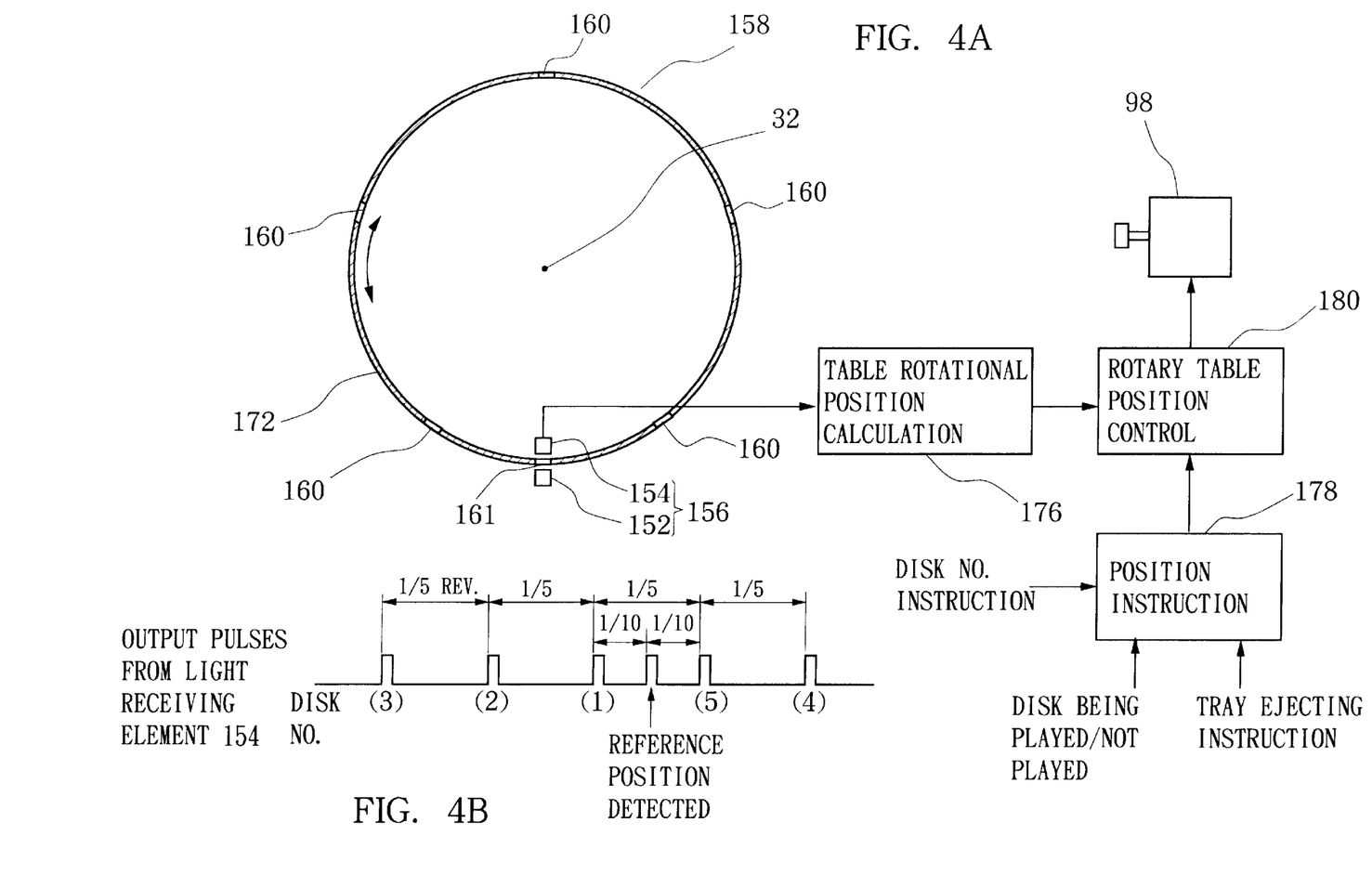
FIG. 4A is a block diagram showing an embodiment of a rotary table rotational position control device employed in the CD changer of FIG. 1.
FIG. 4B shows output pulses from a light receiving element of FIG. 4A.

FIG. 4A shows an example arrangement for performing positioning control of the rotary table 30. The ring-shaped member 158 attached to the underside of the rotary table 30 mostly comprises a light blocking portion 172. and the light transmitting holes 160 and 161 are formed in this light blocking portion 172. The light receiving element 154 of the photo sensor 156 receives the light beams emitted by the light emitting element 152 through each light transmitting hole 160 to thereby output a holding-portion-detection pulse signal for each ⅕ revolution of the rotary table 30. The light receiving element 154 also receives the light beams through the reference position detecting slit 161 to thereby output a reference pulse signal at an interval corresponding to ⅒ revolution from the last-output holding-portion-detection pulse signal. A table rotational position calculating section 176 includes a counter which, on the basis of detection of the reference position, counts the number of the holding-portion-detection pulse signals outputted by the light receiving element 154, and the section 176 calculates which one of the five disc holding portions is currently situated centrally along the width of the rear end portion of the tray 26 in alignment with the playing unit 29 (i.e., in the disc playing position). The rotational reference position is detected by detecting a position where the output pulse interval of the light receiving element 154 is shorter as shown in FIG. 4B.

A position instruction section 178 instructs which one of the six spots detected by the presence of the light transmitting holes 160 and 161 should be positioned in the disc playing position. For example, when one of the discs held on the rotary table 30 is to be played, the instruction section 178 outputs a signal to instruct that one of the disc holding positions 34 corresponding to a designated disc number should be set to the disc playing position. In response to an instruction to eject the transfer tray 26 during playing of a disc by the playing unit 29, the instruction section 178 outputs a signal to instruct that the rotary table 30 should be maintained in the current rotational position (i.e., should be maintained in a state where any one of the disc holding portions 34 occupies the disc playing position). Further, in response to an instruction to eject the transfer tray 26 when the playing unit 29 is not playing any disc 1 (i.e., when no disc 1 is loaded in the playing unit 29), the instruction section 178 causes the rotary table 30 to rotate and detects the rotational reference position (light transmitting portion 161), upon which detection the section 178 causes the transfer tray 26 to move to the ejected position (the tray 26 is moved to the ejected position while the photo sensor 156 is detecting the light transmitting portion 161). A rotary table position control section 180 compares the rotational position instruction given from the instruction section 178 and the rotational position calculation result given from the calculation section 178, so as to drive the table rotating motor 98 so that the instructed position and calculated position coincide with each other.

Next, a detailed description will be made about the tray ejecting operation performed in the CD changer.

(1) Tray ejecting operation performed when no disc is being played:

Once a tray opening key provided on a front panel 170 (FIG. 5) is activated when no disc is being played with the tray 26 in the retracted position, the cam body 94 is rotated by the clamping motor 90 so that the holder 42 is lowered along with the playing unit 29. Then, the rotating motor 98 rotates the gear 106, which in turn rotates the rotary table 30. The rotation of the rotary table 30 is stopped when the light transmitting slit 161 is detected. In this way, the intermediate portion between two adjacent disc holding portions 34 has now been positioned centrally along the width of the rear end portion of the transfer tray 26 in alignment with the reproducing unit 29 (as shown in FIG. 5).

After that, the loading gear 138 is rotated by the loading motor 126 in the arrow "b" direction so that the slide cam 142 is moved in the arrow "d" direction through the meshing engagement between the inner gear portion 138*b* and the rack 144. This causes the protrusion 162 of the slide cam 142 to be pulled out of the cavity 164 formed in the underside of the transfer tray 26, and thereby the tray 26 is released from the locked state in position A. Further, the rotary-table-position detecting block 150 is lowered by the action of the cam groove 148 to disengage the tray locking lever 166 from the plate portion 168 so that the tray 26 is released from the locked state in position B, and the photo sensor 156 is lowered to be moved away from the ring-shaped member 158.

As the loading gear 138 is further rotated in the arrow "b" direction, the slide cam 142 is brought into abutting engagement against a part of the mechanical base 40 immediately before the inner gear portion 138*b* and rack 144 are disengaged from each other, and thus it stops moving in the arrow "d" direction. Still further rotation in the arrow "b" direction of the loading gear 138 causes the inner gear portion 138*b* to be completely disengaged from the rack 144, upon which the outer gear portion 138*a* is brought into meshing engagement with the rack 140 provided on the underside of the transfer tray 26 so as to start moving the tray 26 in the arrow "h" direction.

Once the transfer tray 26 has started moving in the arrow "h" direction, the rotation locking lever 114 is caused to slide in the arrow "p" direction via the resilient urging force of the spring 120 and the gears 104 and 106 are disengaged from each other, upon which the projection 122 of the lever 114 fits into one of the recesses 110 of the rotating member 112. Consequently, the rotary table 30 is locked so as not to be rotated by external force. Then, the transfer tray 26 is moved in this locked state until it reaches the position of FIG. 5. In the position of FIG. 5, more than half of the rearmost disc holding portions 34B (disc number 1) and 34C (disc number 2) are exposed beyond the body 28, and therefore, it is possible to freely conduct disc replacement for all of the five disc holding portions 34.

Once a tray retracting key on the front panel 170 is activated after the disc replacement, the transfer tray 26 is moved back to the retracted position by repeating the above-mentioned procedures in the reversed order, and the tray 26 is locked in position A (FIG. 1A) by the protrusion 162 of the slide cam 142 and in position B (FIG. 1A) by the tray locking lever 166. Then, the gears 104 and 106 mesh with each other so that the rotary table 30 is rotated by the table rotating motor 98, during which time the rotational reference position is detected. After detection of the rotational reference position, the designated disc holding portion 34 is positioned in the disc playing position aligned with the playing unit 29 as shown in FIG. 1; for instance, if the disc holding portion 34B (disc number 1) has been designated when the rotary table 30 is in the position of FIG. 5, then the table 30 is rotated clockwise through an angle corresponding to 1/10 revolution until the first light transmitting slit 160 is detected. After that, the playing unit 29 is raised in the clamped state and playing of the disc is initiated.

Figure 6:
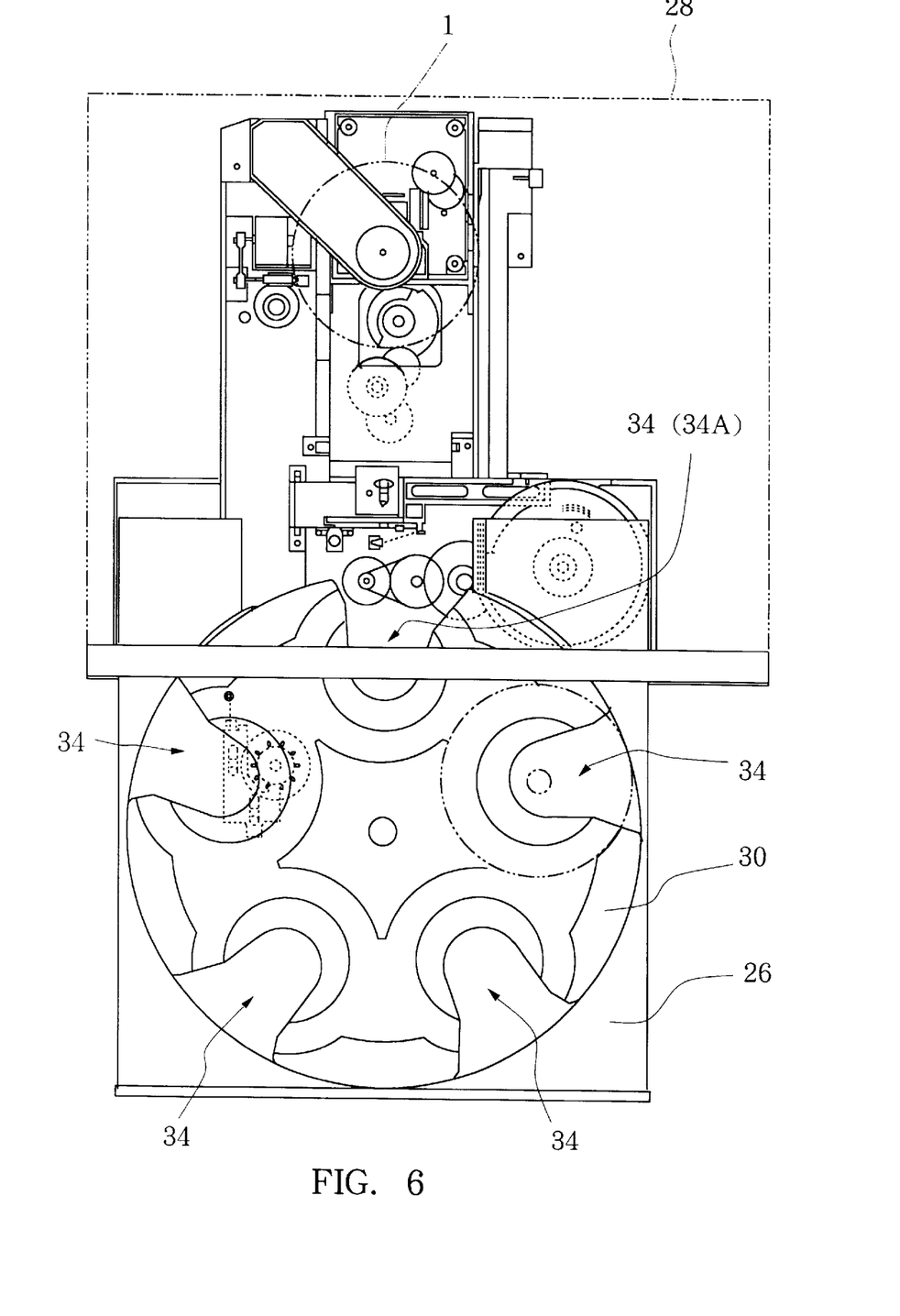
FIG. 6 is a plan view showing the CD changer of FIG. 1 when its transfer tray is ejected during playing of a disc.

(2) Tray ejecting operation performed during playing of a disc:

To move the transfer tray 26 to the ejected position during playing of a disc by the playing unit 29, only the loading motor 126 is activated from the state of FIG. 1 with the clamping and table rotating motor 98 maintained in the deactivated state. In this case as well, the rotary table 30 is locked by the locking lever 114 and is stopped in the position shown in FIG. 6, where more than half of the the rearmost disc holding portion 34A is left hidden within the body 28 so that it is impossible to insert a disc into the holding portion 34A. However, disc replacement can be conducted for the remaining four disc holding portions. This arrangement effectively prevents a disc from being inadvertently set in the holding portion 34A situated in the disc playing position.

The above embodiment achieves the following advantageous results as well as the ones mentioned above in connection with the disc replacement:

1) Because the above embodiment allows all discs on the rotary table 30 to be replaced simultaneously, there is no need to provide a disc skipping function that is intended for replacing discs while rotating the rotary table 30 when the transfer tray 26 is in the ejected position. Therefore, the table rotating motor 98 can be provided on the mechanical base 40 rather than on the tray 26, which makes it unnecessary to lay or install on the tray 26 a cable for feeding electric power to the table rotating motor 98. Further, because the photo sensor 156 is provided on the mechanical base 40 in the embodiment, it is not necessary to install cables for the photo sensor 156.

In the conventionally known disc playing devices where the table rotating motor and photo sensor are provided on the transfer tray, high durability of the cables is required due to the long stroke over which the transfer tray moves between the ejected and retracted positions, and the cables can be a considerable obstruction when the tray is built into the body and while the tray is stored in the body. By contrast, in the above-described embodiment, such inconveniences would not occur because there is no need at all to install cables on the transfer tray.

Figure 7:
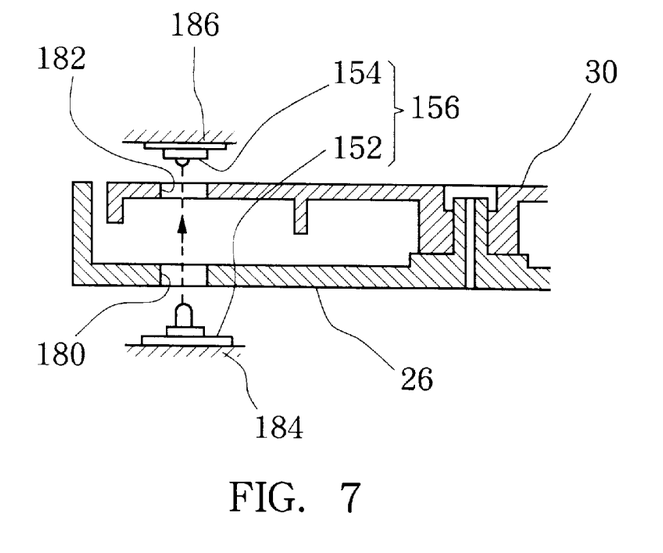
FIG. 7 is a sectional view showing an alternative arrangement of a photo sensor.

2) One method to detect a rotational position of the rotary table without providing the photo sensor 156 on the tray 156 might be realized by an arrangement as shown in FIG. 7, where through-holes 180 and 182 are formed in the tray 26 and rotary table 30, respectively, and the light emitting element 152 and light receiving element 154 are secured to separate mechanical bases 184 and 186 above and below the through-holes 180 and 182 in alignment therewith. But, in this arrangement, because the distance between the light emitting and receiving elements 152 and 154 is relatively long and the two elements 152 and 154 are attached to the separate mechanical bases 184 and 186, it would be extremely difficult to position the two elements 152 and 154 in accurate positional relation to each other, and to maintain the relative positional accuracy if ever obtained successfully. By contrast, in the above embodiment, because the light emitting and receiving elements 152 and 154 are provided on a common mechanical base 40 close to each other with only the ring-shaped member 158 intervening therebetween, it is possible to accurately position the two elements 152 and 154 with utmost ease; besides, once-obtained relative positional accuracy between the elements 152 and 154 can be maintained easily.

3) Finally, because the photo sensor 156 is linked to the tray loading gear 138 and caused to move vertically only during the tray retracting operation, it is allowed to completely prevent the photo sensor 156 from colliding against the tray 26 during the tray ejecting or retracting operation and other erroneous actions, although the photo sensor 156 is disposed separately from the tray 26.

While the embodiment has been described thus far as applied to a CD player, the present invention may be applied to any other disc playing device. The present invention is also applicable to such a disc playing device where the transfer tray can not be moved to the ejected position during playing of a disc.

The disc playing device described thus far is characterized primarily in that, when the transfer tray is to be moved to the ejected position while no disc is played by the playing unit, the intermediate portion between two adjacent disc holding portions is centrally positioned along the width of the rear end portion of the tray, so that the disc holding portion which has been in the disc playing position (i.e., the one having been in the rearmost position on the rotary table) is displaced slightly outwardly (toward the ejected position) away from the playing unit. Thus, in the ejected position of the transfer tray, the most part or substantially all part of the holding portion can project out of the body of the device, and therefore, disc replacement can be freely conducted simultaneously for all the disc holding portions.

We claim:

1. A disc playing device comprising:
 a main body;
 a transfer tray slidingly movable with respect to said main body between a retracted position where said transfer tray is received within said main body and an ejected position where said transfer tray projects out of said main body;
 a rotary table rotatably provided on said transfer tray and having a plurality of disc holding portions formed around a rotational axis of said rotary table;
 a playing unit provided within said main body, for playing a disc placed on one of said disc holding portions which is positioned centrally along a width of a rear end portion of said transfer tray in alignment with said playing unit;

rotary table drive means for rotating said rotary table;

rotary table position detection means for detecting a rotational position of said rotary table, and rotary table position control means for, when a disc is being played by said playing unit, positioning one of said disc holding portions, holding said disc being played, centrally along the width of the rear end portion of said transfer tray so that only said disc holding portion, which holds said disc being played, is partly concealed in said main body when the transfer tray holding the rotary table is ejected from said main body to prevent installing of a new disc into said disc holding portion;

said rotary table position control means positioning the rotary table so that an intermediate portion between two adjacent disc holding portions is placed centrally along the width of the rear end portion of said transfer tray when said transfer tray is in the ejected position with no disc being played by said playing unit, in which all of said disc holding portions are accessible for installing new discs without rotation of the rotary table in the ejected position.

2. A disc playing device as defined in claim 1, further comprising a rotary table locking mechanism which, when the transfer tray is moved to the ejected position, locks the rotary table against rotation from the rotational position.

3. A disc playing device as defined in claim 1, further comprising light blocking and transmitting portions formed in a ring-shaped member and provided on the underside of the rotary table concentrically with the rotary table, wherein the rotary table position detection means comprises a pair of vertically movable light emitting and receiving elements provided on a chassis of the main body and facing each other across the ring-shaped member.

4. A disc playing device comprising:

a housing;

a transfer tray slidingly movable with respect to the housing between a retracted position with the housing and an extended position projecting from the housing;

a rotary table rotatably provided on the transfer tray and having a plurality of disc receptacles formed on the rotary table;

a playing unit provided within the housing, for playing a disc held on one of the disc receptacles;

a rotary table driver for rotating the rotary table;

a position detector for detecting a rotational positon of the rotary table, and a position controller coupled to the position detector to control the position of the rotary table, wherein when the disc is played by the playing unit, the position controller positions only one of said disc receptacles, holding the disc being played, centrally along the width of a rear end portion of the transfer tray and partly concealed in the housing when the transfer tray is in the extended position to prevent installing of a new disc into said disc receptacle which holds the disc being played, and wherein when no disc is being played by the playing unit, the position controller positions the rotary table so that the substantially the same portion of two adjacent disc receptacles are partly concealed in the housing when said transfer tray is in the extended position so that all of said disc holding portions are accessible for installing new discs having a rotary table position controller with improved disc protection and accessibility.

5. A disc playing device of claim 3, further comprising a rotary table lock which, when the transfer tray is in the ejected position, locks the rotary table to prevent rotation.

* * * * *